United States Patent
Min et al.

(10) Patent No.: US 9,356,501 B2
(45) Date of Patent: May 31, 2016

(54) MOTOR FOR DRIVING LENS

(71) Applicant: LG INNOTEK CO., LTD., Seoul (KR)

(72) Inventors: Sangjun Min, Seoul (KR); Taejin Jung, Seoul (KR); Soojin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/697,077

(22) Filed: Apr. 27, 2015

(65) Prior Publication Data

US 2015/0229197 A1      Aug. 13, 2015

Related U.S. Application Data (63) Continuation of application No. 14/093,154, filed on Nov. 29, 2013, now Pat. No. 9,046,640, which is a continuation of application No. 13/202,037, filed as application No. PCT/KR2010/000985 on Feb. 17, 2010, now Pat. No. 8,630,048.

(30) Foreign Application Priority Data

Feb. 17, 2009  (KR) .................. 10-2009-0012860
Mar. 23, 2009  (KR) .................. 10-2009-0024430

(51) Int. Cl.

| G02B 7/02 | (2006.01) |
| H02K 41/035 | (2006.01) |
| G02B 7/04 | (2006.01) |
| G02B 7/09 | (2006.01) |
| G03B 3/10 | (2006.01) |
| H02K 33/02 | (2006.01) |
| H02K 33/18 | (2006.01) |

(52) U.S. Cl.
CPC ............ *H02K 41/0356* (2013.01); *G02B 7/022* (2013.01); *G02B 7/026* (2013.01); *G02B 7/04* (2013.01); *G02B 7/09* (2013.01); *G03B 3/10* (2013.01); *H02K 33/02* (2013.01); *H02K 33/18* (2013.01)

(58) Field of Classification Search
CPC .......... G02B 7/023; G02B 7/04; G02B 7/026; G02B 7/022; G02B 7/09; G02B 7/102; G02B 13/001; G02B 27/646
USPC .................................. 359/694–706, 819–830
See application file for complete search history.

(56) References Cited

U.S. PATENT DOCUMENTS

| 2006/0138873 A1 | 6/2006 | Yasuda |
| 2008/0231974 A1 | 9/2008 | Jung |
| 2008/0247063 A1 | 10/2008 | Otsuki et al. |

(Continued)

FOREIGN PATENT DOCUMENTS

| CN | 101107769 A | 1/2008 |
| CN | 201096947 Y | 8/2008 |

(Continued)

OTHER PUBLICATIONS

International Search Report in International Application No. PCT/KR2010/000985, filed Feb. 17, 2010.

(Continued)

*Primary Examiner* — Mahidere Sahle
(74) *Attorney, Agent, or Firm* — Saliwanchik, Lloyd & Eisenschenk (57) ABSTRACT

A motor for driving a lens is disclosed, wherein a yoke comprises a rotation prevention unit configured to prevent the bobbin from rotating.

26 Claims, 7 Drawing Sheets

(56) References Cited

U.S. PATENT DOCUMENTS

| | | |
|---|---|---|
| 2009/0141373 A1 | 6/2009 | Tang |
| 2010/0271717 A1 | 10/2010 | Sue et al. |
| 2011/0310501 A1 | 12/2011 | Min et al. |
| 2013/0038955 A1 | 2/2013 | Jung |

FOREIGN PATENT DOCUMENTS

| | | |
|---|---|---|
| JP | 2005-128405 A | 5/2005 |
| JP | 2006-178291 A | 7/2006 |
| JP | 2008-268476 A | 11/2008 |
| KR | 10-2007-0075459 A | 7/2007 |
| KR | 10-2007-0078540 A | 8/2007 |
| KR | 10-2007-0091479 A | 9/2007 |
| KR | 10-2007-0109547 A | 11/2007 |
| KR | 10-2008-0046818 A | 5/2008 |
| KR | 10-2008-0054839 A | 6/2008 |
| KR | 10-2008-0068774 A | 7/2008 |
| KR | 10-2009-0026480 A | 3/2009 |
| KR | 1020090076965 A | 7/2009 |
| KR | 10-2010-0106013 A | 10/2010 |
| WO | WO-2007-064140 A1 | 6/2007 |
| WO | WO-2008131637 A1 | 11/2008 |

OTHER PUBLICATIONS

Office Action dated Mar. 18, 2013 in Chinese Application No. 201080008128.2, filed Feb. 17, 2010.

Office Action dated Nov. 14, 2013 in Chinese Application No. 201080008128.2, filed Feb. 17, 2010.

Office Action dated Mar. 6, 2015 in Korean Application No. 10-2009-0012860, filed Feb. 17, 2009.

MOTOR FOR DRIVING LENS

CROSS-REFERENCE TO RELATED APPLICATIONS

This application is a continuation of U.S. application Ser. No. 14/093,154, filed Nov. 29, 2013; which is a continuation of U.S. application Ser. No. 13/202,037, filed Aug. 17, 2011; which is the U.S. national stage application of International Patent Application No. PCT/KR2010/000985, filed Feb. 17, 2010; which claims priority to Korean Application Nos. 10-2009-0012860, filed Feb. 17, 2009, and 10-2009-0024430, filed Mar. 23, 2009, the disclosures of each of which are incorporated herein by reference in their entirety.

TECHNICAL FIELD

The present invention relates to a motor for driving a lens.

BACKGROUND ART

Concomitant with a recent trend toward multifunctional digital devices, a digital device embedded with a camera and an MP3 player has been developed and used. Further, a camera lens embedded in the digital device is automatically moved and adjusted by a motor for driving a lens (hereinafter referred to as "lens-driving motor").

The lens-driving motor has a base and a housing, each coupled together. The housing is disposed therein with a liftable carrier supported by a spring, and the carrier is disposed at an inner surface thereof with a lens.

The lens is screwed to the carrier. That is, the inner surface of the carrier and a periphery of the lens are correspondingly formed with a screw line, whereby the lens is inserted into the carrier and rotated thereinside to allow the lens to be coupled to the carrier.

In a case the lens is inserted into the carrier and rotated thereinside, the carrier is also rotated by torque. In a case the carrier is rotated for more than a predetermined angle, the spring experiences the plastic deformation, rendering the carrier to function in an unsatisfactory way.

However, there is a disadvantage in the conventional lens-driving motor in that there is no means for preventing the carrier from rotating for more than a predetermined angle, resulting in degraded reliability due to the plastic deformation of the spring.

Meanwhile, an attempt is required to slim and miniaturize the lens-driving motor by integrally forming the carrier and the spring to shorten the assembly process, and to constantly maintain an initially coupled status between the carrier and the spring lest the carrier and the spring should be easily separated or deformed.

Technical Problem

The present invention is disclosed to obviate the above-mentioned problems, and it is an object of the present invention to provide a lens-driving motor configured to prevent a spring from experiencing the plastic deformation caused by an assembly torque during assembly between a lens and a carrier. Another object is to provide a lens-driving motor configured to simplify and improve an assembled structure between the carrier and the spring and to constantly maintain an initial status lest a coupled structure between the carrier and the spring should be easily destructed.

Technical Solution

In one general aspect of the present invention, there is provided a voice coil motor, comprising: a mover including a bobbin including a lower bobbin portion having a lens secured therein and an upper bobbin portion protruded from an upper surface of the lower bobbin portion in a direction parallel to an optical axis of the lens, and a coil secured to a periphery of the lower bobbin portion; at least one magnet facing the coil; a yoke fixing the at least one magnet and comprising a rotation prevention unit configured to prevent the bobbin from rotating; and an elastic member supporting the bobbin, wherein the rotation prevention unit comprises: a lateral portion extending laterally from the yoke; and a downward portion extending downwardly from the lateral portion toward the upper surface of the lower bobbin portion.

In another general aspect of the present invention, there is provided an optical device comprising a voice coil motor and a lens and a sensor, wherein the voice coil motor, comprising: a mover including a bobbin including a lower bobbin portion having a lens secured therein, an upper bobbin portion cylindrically protruded from an upper surface of the lower bobbin portion, at least one rotation prevention groove formed in the upper bobbin portion and exposing an upper surface of the first bobbin within the at least one rotation prevention groove, and a coil secured to a periphery of the lower bobbin portion; at least one magnet facing the coil; a yoke fixing the at least one magnet and comprising a rotation prevention unit extended to the rotation prevention groove to face the upper bobbin portion; and an elastic member supporting the bobbin, wherein the rotation prevention unit comprises: a lateral portion extending laterally from the yoke; and a downward portion extending downwardly into the rotation prevention groove and toward the upper surface of the lower bobbin portion.

Advantageous Effects

The lens-driving motor according to the present invention is advantageous in that one side of an outer surface of a carrier is supportively inserted into a yoke fixed at a housing to prevent the carrier from rotating at a predetermined angle or more, whereby a spring supporting the carrier is not rotated at a predetermined angle or more either, and the spring is deformed only within a scope of elastic limit to allow the spring to properly function at all times to an enhanced reliability of the product.

The lens-driving motor according to the present invention is further advantageous in that through holes through which the carrier passes are formed at an inner surface of the spring buried in a periphery of the carrier, whereby the spring is prevented from being disengaged from the carrier to an enhanced reliability of the product.

DETAILED DESCRIPTION

A lens-driving motor according to exemplary embodiments of the present invention will be described in detail with reference to the accompanying drawings.

Figure 1:
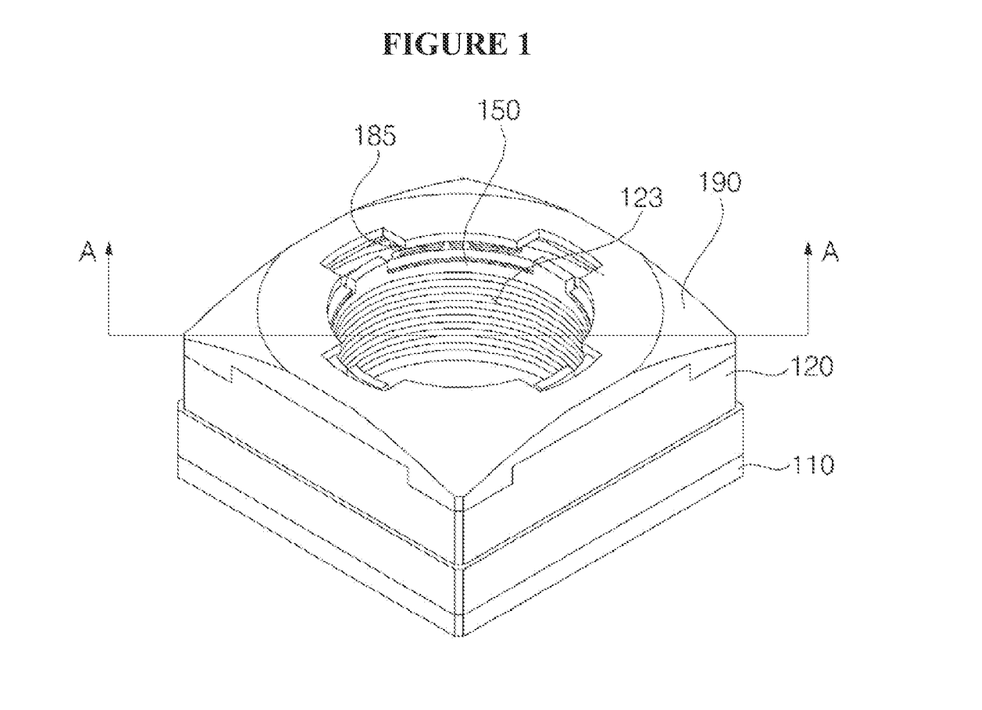
FIG. 1 is a perspective view of a lens-driving motor according to an exemplary embodiment of the present invention.
Figure 2:
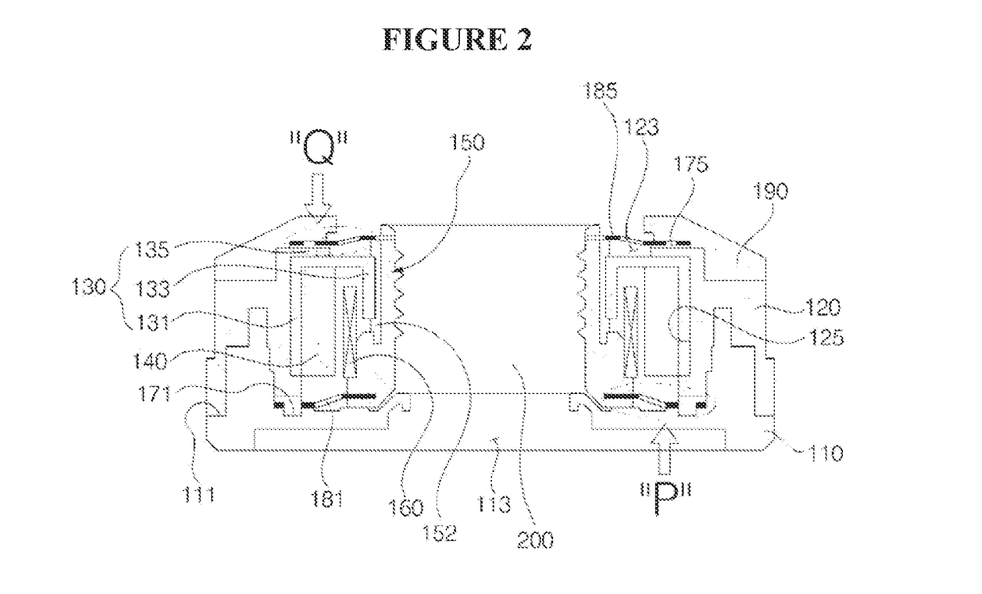
FIG. 2 is a cross-sectional view along line "A-A" of FIG. 1.
Figure 3:
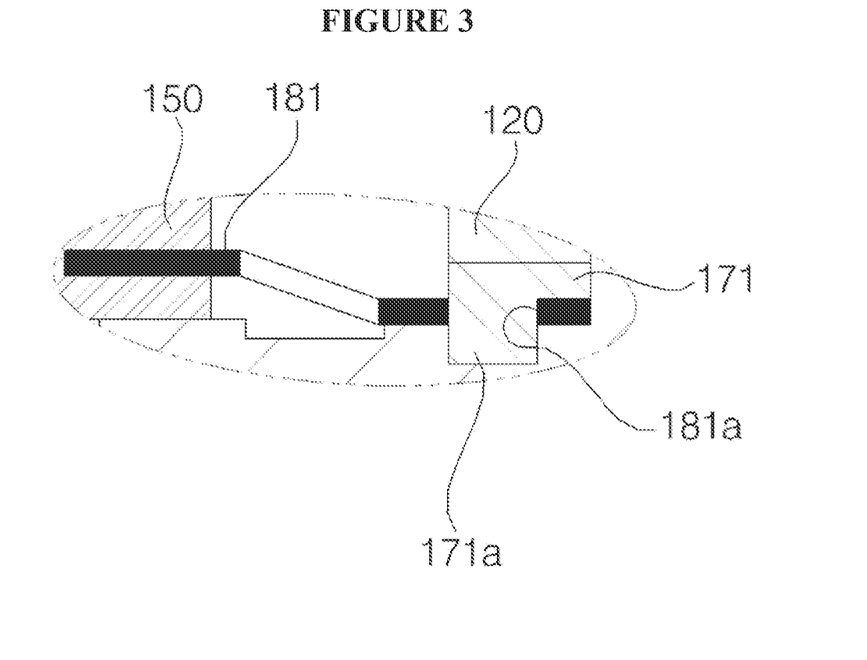
FIGS. 3 and 4 are enlarged views of a "P" part and a "Q" part of FIG. 2.
Figure 4:
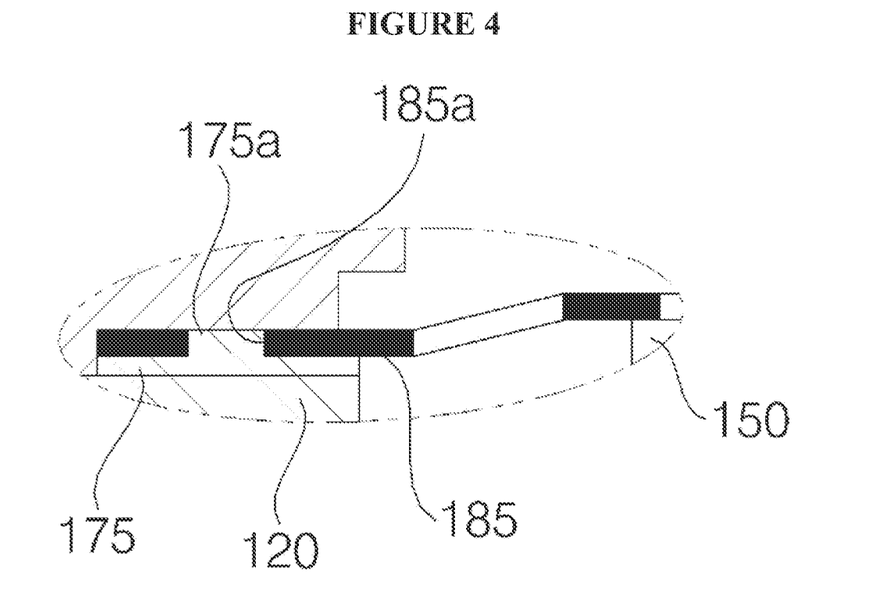

FIG. 1 is a perspective view of a lens-driving motor according to an exemplary embodiment of the present invention, FIG. 2 is a cross-sectional view along line "A-A" of FIG. 1, and FIGS. 3 and 4 are enlarged views of a "P" part and a "Q" part of FIG. 2.

As illustrated, a lens-driving motor according to the present invention includes a base (110) and a housing (120) each coupled together to form an inner space therebetween. In designating a direction and a surface of constituent parts including the base (110), a direction and a surface facing an upper vertical side of the base (110) are respectively called "an upper side" and "an upper surface", while a direction and a surface facing a bottom vertical side of the base are respectively called "a bottom side" and "a bottom surface".

The housing (120) is coupled at a bottom surface to the base (110). An edge of the base (110) is formed with a stair (111) into which a bottom surface of the housing is inserted, whereby foreign objects are prevented from entering a coupled part between the base (110) and the housing (120). An upper surface of the base (110) and the housing (120) is formed with a through hole (113) and an inlet/outlet hole (123) each facing the other.

A yoke (130) is formed at an inner surface of the housing (120). Meanwhile, it should be apparent that the housing (120) may be coupled with the yoke (130), or the housing itself may be a yoke. The yoke (130) may include a square frame-shaped outer wall (131), an ring-shaped inner wall (133) formed inside the outer wall (131), and a connection plate (135) connected to an upper end surface of the outer wall (131) and to an upper end surface of the inner wall (133) to integrally connect the outer wall (131) and the inner wall (133).

The outer wall (131) of the yoke (130) and the connection plate (135) are wrapped by the housing (120) to form an integrated shape. At this time, an accommodation groove (125) is formed at an inner surface of the housing (120) for the outer wall (131) of the yoke (130) to be inserted and accommodated therein, whereby the yoke (130) is integrally and securely formed with the housing (120).

An inner surface of an edge side of the outer wall (131) on the yoke (130) is disposed with a magnet (140), and an inner side of the inner wall (133) on the yoke (130) is liftably mounted with a carrier (150) to allow entering an inlet/outlet hole (123). A lens (200) is mounted at an inner surface of a carrier (150) and a coil (160) is wound on a periphery of the carrier (150).

The coil (160) is oppositely formed from the magnet (140), and in a case a current flows in the coil (160), the coil (160) is lifted by an electromagnetic force formed between the coil (160) and the magnet (140), which in turn raises the carrier (150) to lift the lens (200). The housing (120) is integrally formed with a ring-shaped resilient spacer for compensating a dimensional tolerance of parts and an assembly tolerance generated in the course of assembling the parts. The spacer includes first and second spacers (171, 175) integrally and respectively formed at a bottom end surface and an upper end surface of the housing (120).

The housing is formed by injection molding, and the yoke (130) and the spacer are integrally formed during injection molding of the housing (120).

The carrier (150) lifted by the electromagnetic force is lowered by a spring including first and second springs (181, 185) to return to its original status.

To be more specific, an inner surface of the first spring (181) is integrally formed with an outer surface of bottom side of the carrier (150), and an outer surface of the first spring (181) is inserted into the base (110) and the first spacer (171) to be supported thereat. An inner surface of the second spring (185) is coupled to an upper outer surface of the carrier (150), and an outer surface of the second spring (185) is inserted into a cover (190) coupled to an upper surface of the housing (120) and the second spacer (175) to be supported thereat.

In a case a current flows in the coil (160) to lift the carrier (150), the first and second springs (181, 185) are elastically deformed, and in a case the current is stopped from the coil (160), the carrier (150) returns to an initial status by the elasticity of the first and second springs (181, 185).

Coupling holes (181a, 185a) and coupling protrusions (171a, 175a) are formed, each facing the other and the protrusions being inserted into the coupling holes, at an outer surface of the first and second springs (181, 185) and the first and second spacers (171, 175). The cover (190) is mounted on an upper surface of the housing (120) to cover the second spacer (175) and to prevent foreign objects from entering the coupled part between the base and the housing.

Screw threads are formed on an inner surface of the carrier (150) and an outer surface of the lens (200), each corresponding to the other, where the lens (200) is screwed to the carrier (150). That is, the lens (200) is inserted into and rotated in the carrier (150) to couple the lens (200) with the carrier (150), whereby the carrier (150) can be rotated by torque. In a case the carrier (150) is rotated at a predetermined angle or more, the first and second springs (181, 185) experience the plastic deformation to create a problem of not performing a proper function.

Figure 5:
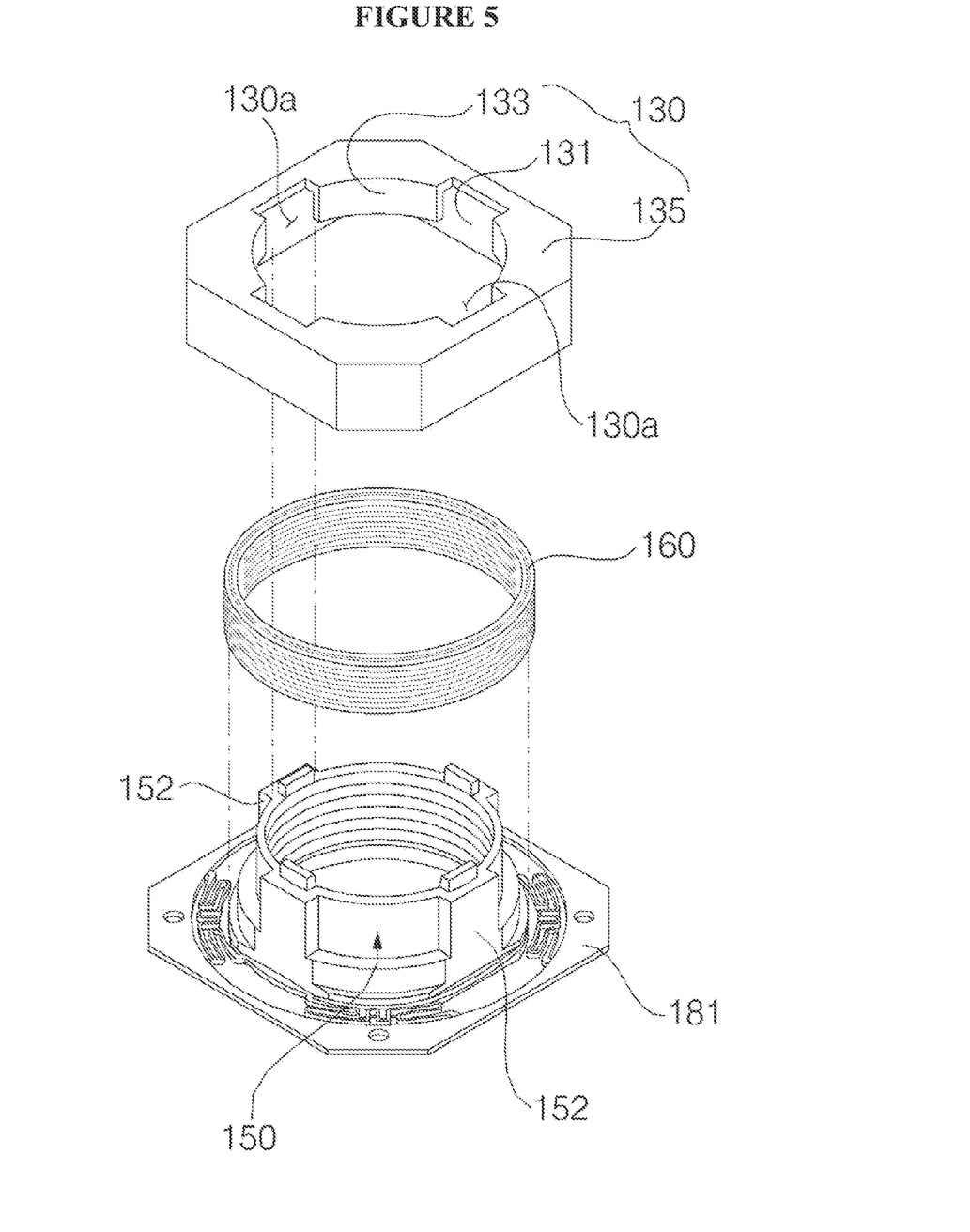
FIG. 5 is an exploded perspective view of an essential part of FIG. 1.

The lens-driving motor according to the present invention prevents the carrier (150) from rotating at a predetermined angle or more by supporting the carrier (150) to the yoke (130), the operation of which will be described with reference to FIGS. 2 and 5. FIG. 5 is an exploded perspective view of an essential part of FIG. 1.

As shown in the figures, the carrier (150) is protrusively formed at an outer surface with a plurality of hitching rails (152) in parallel with a motional direction of the carrier (150), and an opening groove (130a) is formed at the yoke (130) fixed at the housing (120) or at an inner surface of the housing (120), where the hitching rails (152) are insertedly hitched by the opening groove (130a), and the opening groove (130a) and the hitching rails (152) are formed in parallel with the motional direction of the carrier (150).

In this case, even if the carrier is rotated by the torque generated in the course of the lens (200) being coupled to the carrier (150), the hitching rails (152) are hitched at the housing or the yoke forming the opening groove (130a) to prevent the carrier (150) from rotating at a predetermined angle or more.

The opening groove (130a) is formed at a portion where the connection plate (135) contacting the inner wall (133) and the inner wall (133) of the yoke (130) are joined.

Now, as an improvement to the aforementioned exemplary embodiment, an exemplary embodiment configured to reduce an assembly process by integrally forming a carrier and a spring, and an exemplary embodiment configured to constantly maintain an initial status by preventing the carrier and the spring from being easily separated or deformed will be described.

Figure 6:
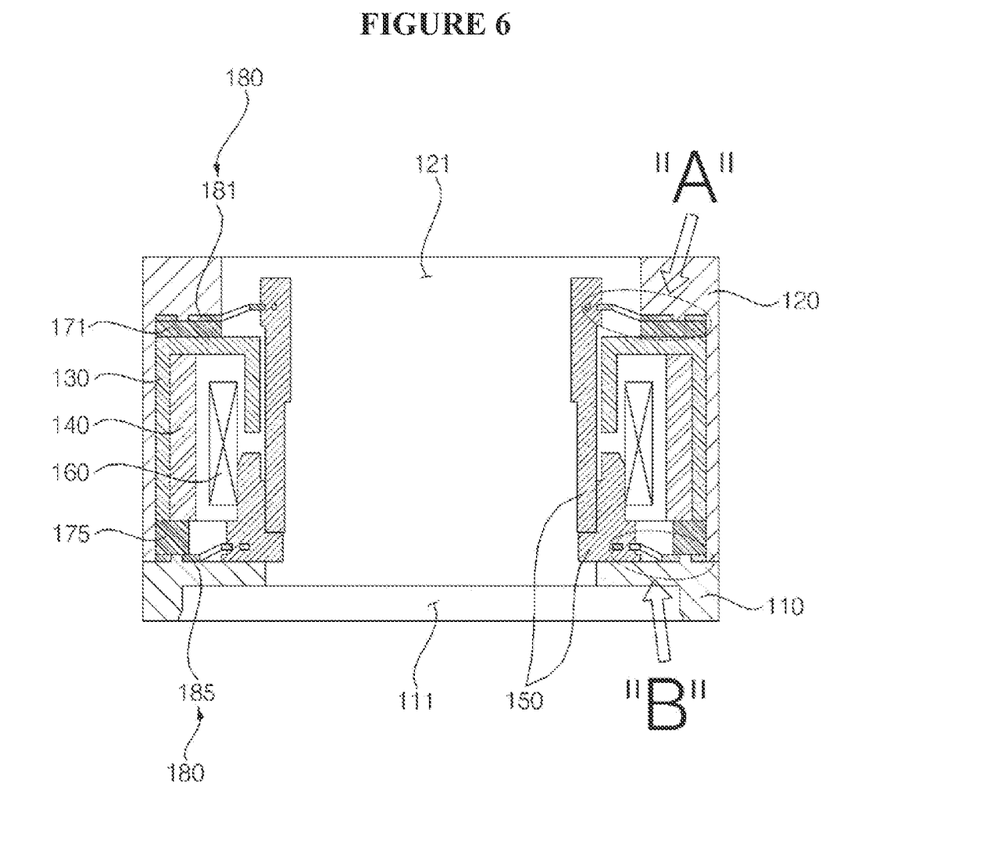
FIG. 6 is a cross-sectional view of a lens-driving motor according to an exemplary embodiment of the present invention.
Figure 7:
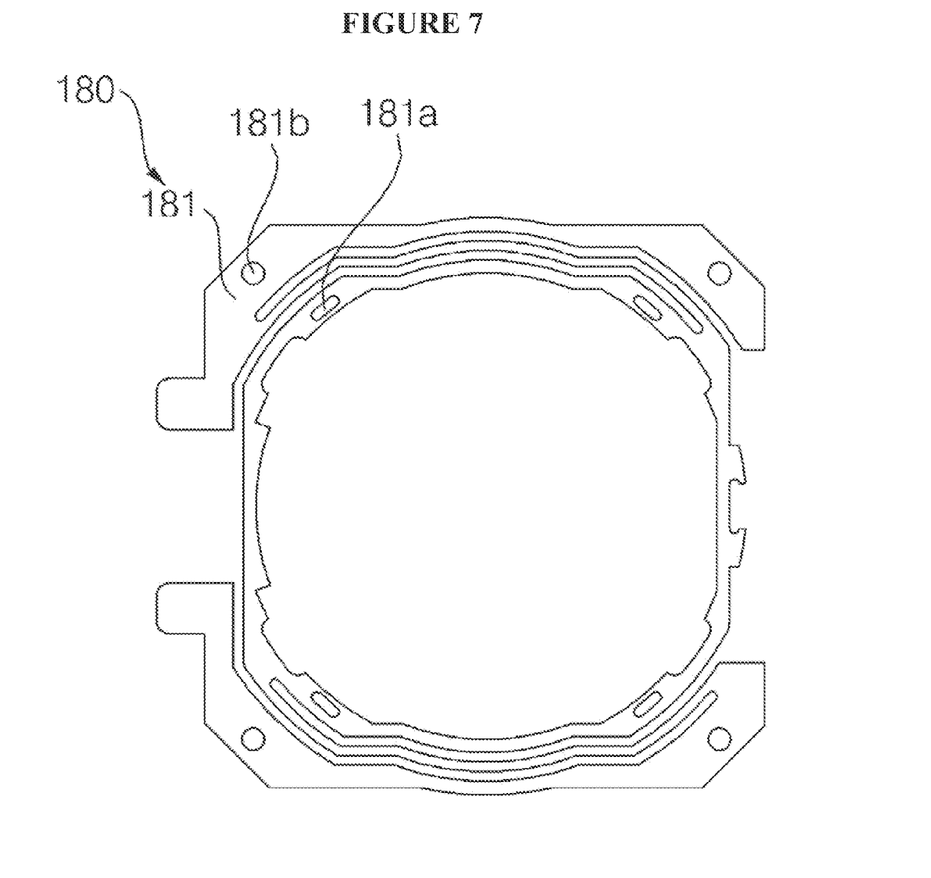
FIG. 7 is a plan of a spring illustrated in FIG. 6.
Figure 8:
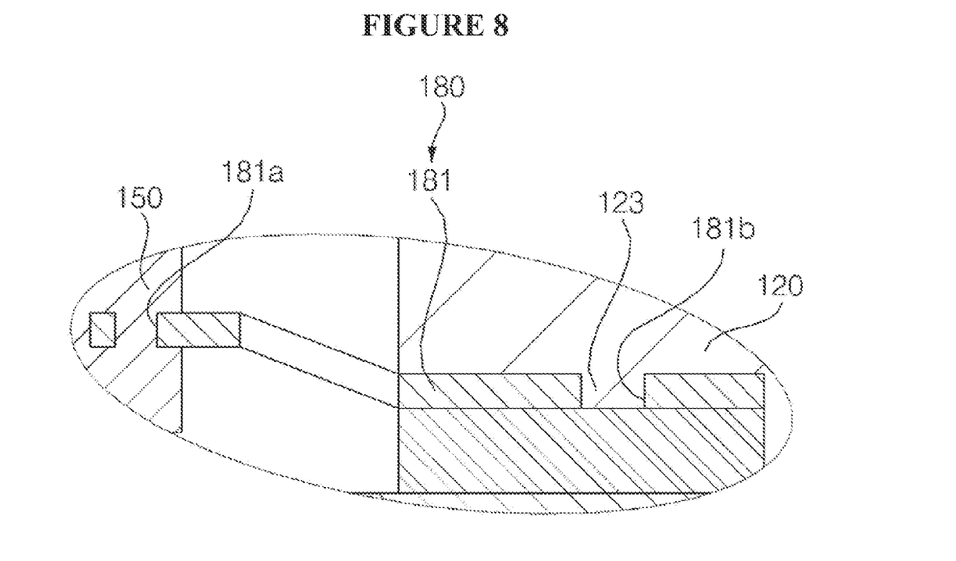
FIGS. 8 and 9 are enlarged views of a "A" part and a "B" part of FIG. 6.
Figure 9:
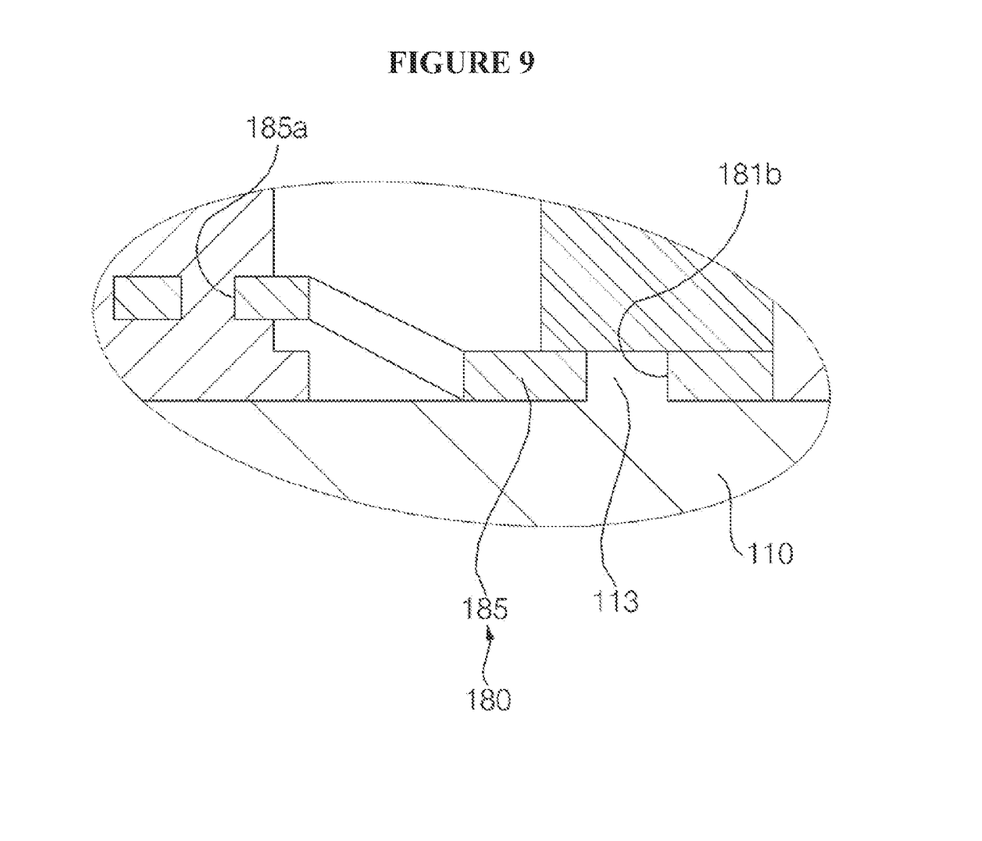
Figure 10:
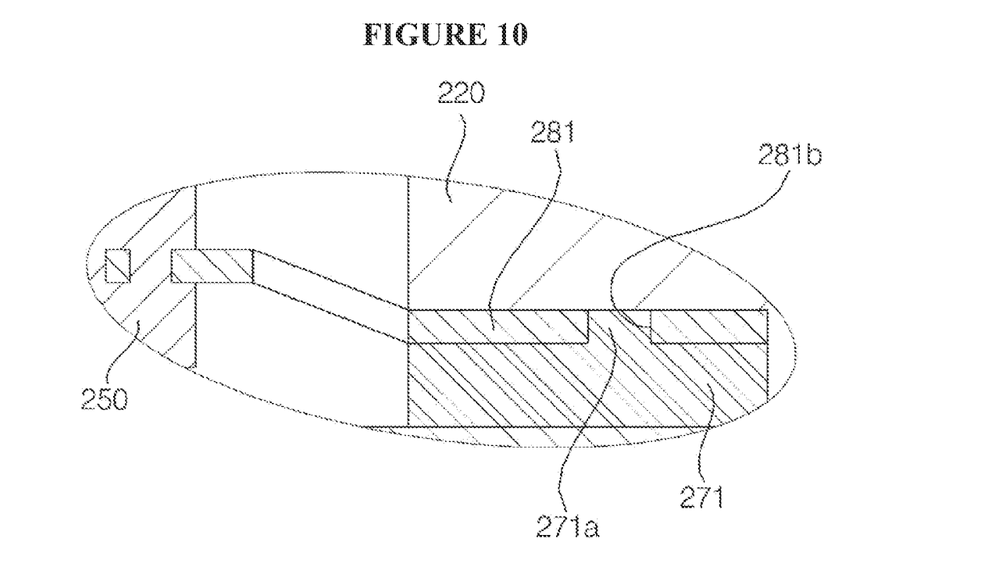
FIGS. 10 and 11 are enlarged views of an essential part in a lens-driving motor according to another exemplary embodiment of the present invention.
Figure 11:
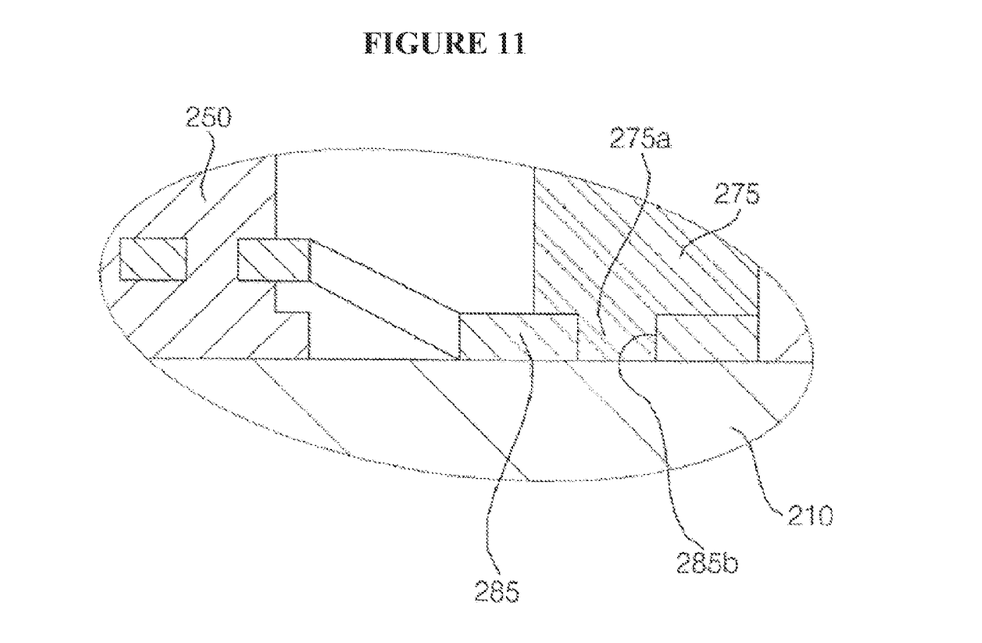

FIG. 6 is a cross-sectional view of a lens-driving motor according to an exemplary embodiment of the present invention, FIG. 7 is a plan of a spring illustrated in FIG. 6, FIGS. 8 and 9 are enlarged views of a "A" part and a "B" part of FIG. 6 and FIGS. 10 and 11 are enlarged views of an essential part in a lens-driving motor according to another exemplary embodiment of the present invention.

Referring to FIGS. 6 to 11, a ring-shaped spring (180) is mounted at upper and bottom sides of the yoke (130). The carrier (150) lifted by operations of the coil (160) and the magnet (140) returns to its original shape by the elasticity of the spring (180) if a current is stopped from flowing in the coil (160). The spring (180) includes a plurality of springs each having a different diameter that form a concentricity. The spring (180) may include a first spring (181) mounted at an upper side of the first spacer (171) and a second spring (185) mounted at a bottom surface of the second spacer (175).

To be more specific, an inner surface of the first spring (181) is integrally formed with an outer surface of upper side of the carrier (150), and an outer surface of the first spring (181) is inserted into the housing (120) and the first spacer (171) to be supported thereat. An inner surface of the second spring (185) is coupled to a bottom outer surface of the carrier (150), and an outer surface of the second spring (185) is inserted into the base (110) and the second spacer (175) to be supported thereat. The first and second springs (181, 185) are configured in the same shape and same construction but may differ in diameters thereof according to positions coupled to the carrier (150).

In order to simplify an assembled structure, the carrier (150) is injection molded, and the spring (180) is integrally formed by an insert injection molding method in which an inner side of the spring (180) is buried in an outer surface of the carrier (150) during injection of the carrier (150).

Meanwhile, an area of an inner circumferential surface of the spring (180) that is buried by the outer surface of the carrier (150) tends to grow small due to slimness and miniaturization of the lens-driving motor, which may spawn the fear of disengaging the inner circumferential surface of the spring (180) from the carrier (150).

The lens-driving motor according to the present invention is configured to prevent the spring (180) from disengaging from the carrier (150), the operation of which will be described with reference to FIGS. 8 and 9. FIGS. 8 and 9 are enlarged views of a "A" part and a "B" part of FIG. 6.

Referring to FIGS. 8 and 9, an inner circumferential surface of the first and second springs (181, 185) that are buried in the outer surface of the carrier (150) are formed with a plurality of through holes (181a, 185a), whereby an inner surface at the outer surface of the carrier (150) passes the through holes (181a, 185a) to be integrally formed with the first and second springs (181, 185), such that the first and second springs (181, 185) are prevented from being disengaged from the carrier (150).

The lens-driving motor according to the present invention is configured in such a manner that a plurality of support holes (181b, 185b) are formed at an outer surface side of the first and second springs (181, 185), and the support protrusions (123, 113) that are inserted into the support holes (181b, 185b) are formed at the housing (120) and the base (110).

Then, the first and second springs (181, 185) are accurately coupled to preset portions of the housing (120) and the base (110) to prevent the first and second springs (181, 185) from rotating on the housing (120) and the base (110), whereby forces from the first and second springs (181, 185) are uniformly distributed on all areas of the carrier (150) to allow the carrier (150) to stably and accurately descend and ascend.

FIGS. 10 and 11 are enlarged views of an essential part in a lens-driving motor according to another exemplary embodiment of the present invention, where only the difference from that of FIGS. 8 and 9 will be described.

As illustrated, a plurality of support holes (281b, 285b) respectively formed at an outer surface side of first and second springs (281, 285) are respectively inserted by support protrusions (271a, 275a) formed at first and second spacers (271, 275). The first and second springs (281, 285) are accurately coupled to preset portions of a housing (220) and a base (210) to prevent the first and second springs (281, 285) from rotating on the housing (220) and the base (210), whereby forces from the first and second springs (281, 285) are uniformly distributed on all areas of a carrier (250) to allow the carrier (250) to stably and accurately descend and ascend.

While the present disclosure has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

The lens-driving motor according to the present invention has an industrial applicability in that one side of an outer surface of a carrier is supportively inserted into a yoke fixed at a housing to prevent the carrier from rotating at a predetermined angle or more, whereby a spring supporting the carrier is not rotated at a predetermined angle or more either, and the spring is deformed only within a scope of elastic limit to allow the spring to properly function at all times to an enhanced reliability of the product.

The lens-driving motor according to the present invention is further advantageous in that through holes through which the carrier passes are formed at an inner surface of the spring buried in a periphery of the carrier, whereby the spring is prevented from being disengaged from the carrier to an enhanced reliability of the product.

What is claimed is:

1. A voice coil motor, comprising:
   a base;
   a yoke being a housing and including an outer wall, a connection plate extending inwardly from an upper portion of the outer wall, and a plurality of inner walls formed inside the outer wall and extending downwardly from an inner portion of the connection plate, the yoke being coupled to the base;
   a carrier disposed at an inner side of the inner walls of the yoke and for being coupled with a lens;
   a coil wound on a periphery of the carrier;
   a spring member including a first spring coupled to an upper portion of the carrier and a second spring coupled to a lower portion of the carrier; and
   a magnet disposed on an inner surface of the outer wall on the yoke;
   wherein the carrier includes a plurality of rotation prevention grooves;
   wherein the plurality of inner walls include a first inner wall and a second inner wall spaced from the first inner wall;
   wherein the plurality of rotation prevention grooves include a first rotation prevention groove and a second rotation prevention groove;

wherein the first inner wall is disposed in the first rotation prevention groove, and the second inner wall is disposed in the second rotation prevention groove;

wherein the yoke further includes a groove portion disposed at the inner portion of the connection plate and between the first inner wall and the second inner wall; and wherein the first inner wall is downwardly extended from an end portion of a first side surface of the groove portion, and an end portion of a side surface of the first inner wall is directly contacted to the end portion of the first side surface of the groove portion.

2. The voice coil motor of claim 1, wherein the plurality of rotation prevention grooves are configured to inhibit the carrier from rotating at a predetermined angle or more.

3. The voice coil motor of claim 1, wherein the yoke comprises at least three inner walls, wherein the carrier comprises at least three rotation prevention grooves, and wherein each inner wall is disposed in a respective rotation prevention groove.

4. The voice coil motor of claim 1, wherein the second spring comprises a plurality of support holes formed at an outer surface side thereof.

5. The voice coil motor of claim 1, wherein an inner lateral surface of the carrier takes the shape of a cylinder.

6. The voice coil motor of claim 3, wherein the rotation prevention grooves are disposed in an equidistant manner.

7. The voice coil motor of claim 1, wherein the carrier lifted by operations of the coil and the magnet returns to its initial position by the spring member.

8. The voice coil motor of claim 1, wherein the connection plate includes an opening for exposing the carrier, and wherein the inner wall is bent from the connection plate.

9. The voice coil motor of claim 1, wherein the magnet is fixed in the yoke at a position corresponding to the first inner wall.

10. The voice coil motor of claim 1, wherein the first inner wall faces the first rotation prevention groove.

11. The voice coil motor of claim 1, wherein the first inner wall comprises a curved plate.

12. The voice coil motor of claim 1, wherein the carrier comprises a boss protruded from an upper surface thereof and coupled to the second spring.

13. An optical device comprising a voice coil motor, a lens, and a sensor, wherein the voice coil motor comprises:

a base;

a yoke being a housing and including an outer wall, a connection plate extending inwardly from an upper portion of the outer wall, and a plurality of inner walls formed inside the outer wall and extending downwardly from an inner portion of the connection plate, the yoke being coupled to the base;

a carrier disposed at an inner side of the inner walls of the yoke and for being coupled with a lens;

a coil wound on a periphery of the carrier;

a spring member including a first spring coupled to an upper portion of the carrier and a second led to a lower portion of the carrier; and a magnet disposed on inner surface of the outer wall on the yoke;

wherein the carrier includes a plurality of rotation prevention grooves;

wherein the plurality of inner walls include a first inner wall and a second inner wall spaced from the first inner wall, wherein the plurality of rotation prevention grooves include a first rotation prevention groove and a second rotation prevention groove;

wherein the first inner wall is disposed in the first rotation prevention groove, and the second inner wall is disposed in the second rotation prevention groove;

wherein the yoke further includes a groove portion disposed at the inner portion of the connection plate and between the first inner wall and the second inner wall; and wherein the first inner wall is downwardly extended from an end portion of a first side surface of the groove portion, and an end portion of a side surface of the first inner wall is directly contacted to the end portion of the first side surface of the groove portion.

14. The voice coil motor of claim 1, wherein a portion of the carrier between the first rotation prevention groove and an adjacent rotation prevention groove shares a side surface, and wherein the coil is wound on a portion of the shared side surface.

15. A camera comprising at least one lens and the voice coil motor of claim 1.

16. A digital device comprising the camera of claim 15.

17. The voice coil motor of claim 1, wherein a width of the inner wall corresponds with a width of the rotation prevention groove.

18. The voice coil motor of claim 1, wherein when the yoke is viewed from above, the groove portion begins at the side surface of the first inner wall.

19. The voice coil motor of claim 18, wherein when the yoke is viewed from above, the groove portion extends from the side surface of the first inner wall to a side surface of the second inner wall.

20. The voice coil motor of claim 1, wherein the second inner wall is adjacent to the first inner wall.

21. The voice coil motor of claim 1, wherein the first side surface lies in a same plane as a side surface of the first inner wall.

22. The voice coil motor of claim 21, wherein the groove portion further includes a second side surface spaced from the first side surface and a connection surface connecting the first side surface and the second side surface.

23. The voice coil motor of claim 22, wherein the second side surface lies in a same plane as a side surface of the second inner wall.

24. The voice coil motor of claim 22, wherein the connection surface of the groove portion is a flat surface.

25. The voice coil motor of claim 21, wherein the first spring is disposed between the yoke and the base.

26. The voice coil motor of claim 13, wherein the first spring is disposed between the yoke and the base.

* * * * *